United States Patent [19]
Byrd

[11] 3,879,641
[45] Apr. 22, 1975

[54] UTILITY METER PEDESTAL-FOUNDATION MOUNTING

[76] Inventor: Curtis W. Byrd, 42501 JoEd St., Sterling Heights, Mich. 48078

[22] Filed: Aug. 10, 1973

[21] Appl. No.: 387,518

Related U.S. Application Data

[63] Continuation-in-part of Ser. No. 224,166, Feb. 7, 1972, abandoned.

[52] U.S. Cl. .................. 317/104; 52/221; 174/38
[51] Int. Cl. ............................................. H02b 9/00
[58] Field of Search...... 317/99, 104, 105, 109–111, 317/120; 174/48, 49, 38; 52/221

[56] References Cited
UNITED STATES PATENTS

| | | | |
|---|---|---|---|
| 2,723,822 | 11/1955 | McGuire | 52/221 |
| 3,502,785 | 3/1970 | Nickola | 174/38 |
| 3,691,288 | 9/1972 | Sturdivan | 317/104 |

*Primary Examiner*—Robert K. Schaefer
*Assistant Examiner*—Gerald P. Tolin
*Attorney, Agent, or Firm*—Thomas N. Young

[57] ABSTRACT

A utility meter pedestal for mounting a utility meter on the foundation of a building prior to the construction of the walls thereof including a vertical support member for mounting the utility meter thereon and a bracket for securing the vertical support member to the foundation of a building. In one embodiment, the vertical support member is covered by the building facing material whereby, for aesthetic reasons, only the utility meter is exposed. In another embodiment, the support member is left exposed. In the second embodiment, a temporary power outlet is provided such that power used during construction can be metered.

10 Claims, 7 Drawing Figures

3,879,641

PATENTED APR 22 1975

UTILITY METER PEDESTAL-FOUNDATION MOUNTING

This is a continuation-in-part Application of United States Ser. No. 224,166, filed Feb. 7, 1972, and entitled "Utility Meter Pedestal — Foundation Mounting".

This invention relates to a new and unique pedestal for supporting utility meters on buildings. The instant invention has special application where buried or underground utilities are used. The utility meter pedestal of the instant invention is especially designed to support utility meters on the building during the early construction stages of the building to allow hookup and use of the various utilities during subsequent construction activity. The instant invention is directed toward electric service meters, or watt-hour meters and will be described with reference thereto. However, it will be understood that the structure may be utilized for other types of meters, such as gas and water, for the same purposes.

BACKGROUND OF THE INVENTION

A problem which arises whenever a new building is being constructed is the general unavailability of electrical power during the early stages of construction. Electrical power cannot be supplied to the new building until the watt-hour meter has been installed. The watt-hour meter, on the other hand, cannot be installed until the walls of the building are erected because the watt-hour meter is normally mounted on a wall. Consequently, much of the construction must be completed without the convenience of an easily accessible power supply. The result is that the construction workers must draw their power from other sources; i.e., buildings with power or special outlet boxes for construction purposes installed on service poles. This problem is greatly aggravated in newer housing projects and subdivisions wherein underground electrical service has been installed, therefore, eliminating the possibility of providing outlet boxes on service poles. The only source of electric power available to operate power saws and other equipment is neighboring buildings which are completed or in advanced stages of construction and, therefore, have electric service.

Since buildings which have electric power are often located at an inconveniently large distance from the construction site, it is necessary to have many feet of extension cable available. The excessive use of extension cable is not the most desirable solution to the problem for a number of reasons. Power losses over the long lengths of cable may cause damage to power eqipment; other construction workers may trip over partially hidden extension cables; cables may be damaged by equipment used on the construction site; the cables are a nuisance to retrieve after each day's work; they may become muddy and even more difficult to retrieve; and they are expensive.

BRIEF SUMMARY OF THE INVENTION

The present invention provides a solution to the problems set forth above in providing a support for the watt-hour meter which may be installed early in the construction period; i.e., even before above-ground walls are erected, so that the underground cable may be hooked up to the watt-hour meter and then either to a temporary outlet or to the distribution panel, thereby providing a ready and convenient source of metered power during the construction phase.

The advantages afforded to construction companies by the use of the utility meter pedestal of the instant invention are very significant. The feeder trenches for the underground cables can be dug and the cables laid while the basement is being excavated and poured. The watt-hour meter can be installed by the power company and the power hooked up to the building immediately instead of waiting for the building walls to be completed, thereby eliminating the need for a return trip by the power company. The availability of electric power eliminates the installation of the commonly used temporary service arrangements which must be removed at a later date. Once the electrician has wired the building, the permanent building circuits may immediately be put to use instead of lying unused until the power company is available to hook up the service as is now the common practice.

If the building is to receive gas service, then the gas meter may be installed after the foundation is poured and the gas connected to the building. The gas is then available fuel for use in temporary heaters to heat the building during winter months, thereby providing a much more comfortable working environment for the finish carpenters, plumbers, etc. working on the inside of the building. Heretofore heaters required bottled gas or bulky cans of oil, but since a convenient source of fuel is available, a temporary heater is easy to install and use. Lighting, power, heat, water can all be supplied without making special provisions for temporary service during construction, facilitating economy of operation and the convenience of works. These are only a few of the many applications to which the utility meter pedestal of the instant invention may be applied; there are numerous others which will become obvious to persons familiar with the construction trades which will increase the efficiency of operation and decrease the cost of construction activities.

It is, therefore, an object and feature of the instant invention to provide a utility meter pedestal of a type to be mounted on the fundation of a building comprising; a vertical support member including bracket means extending therefrom for ridigly securing the vertical support member to the foundation of the building and connecting means attached to the vertical support means for mounting a utility meter thereon, whereby the utility meter is supported in an elevated position above the foundation of the building, thereby permitting the installation of the utility meter before the upper walls of the building have been erected.

It is another object and feature of the instant invention to provide a utility meter pedestal having one embodiment wherein the connecting means is spaced forwardly from the vertical support member whereby a suitable facing material, such as bricks, is received over the vertical support member but exposing the mounting surface of the connecting means for mounting the utility meter thereto while effectively hiding the support member. In another embodiment, the support member remains outside the facing material and can carry a temporary power outlet which remains functional until the distribution panel of the building is installed and wired.

Other objects and attendant advantages of the instant invention will be readily appreciated as the same becomes better understood by reference to the following

BRIEF DESCRIPTION OF THE DRAWINGS

Referring now to FIGS. 1 through 5 in the drawings, wherein like numerals indicate like or corresponding parts throughout the several views, a utility meter pedestal constructed in accordance with the instant invention is generally shown at 10.

Figure 1:
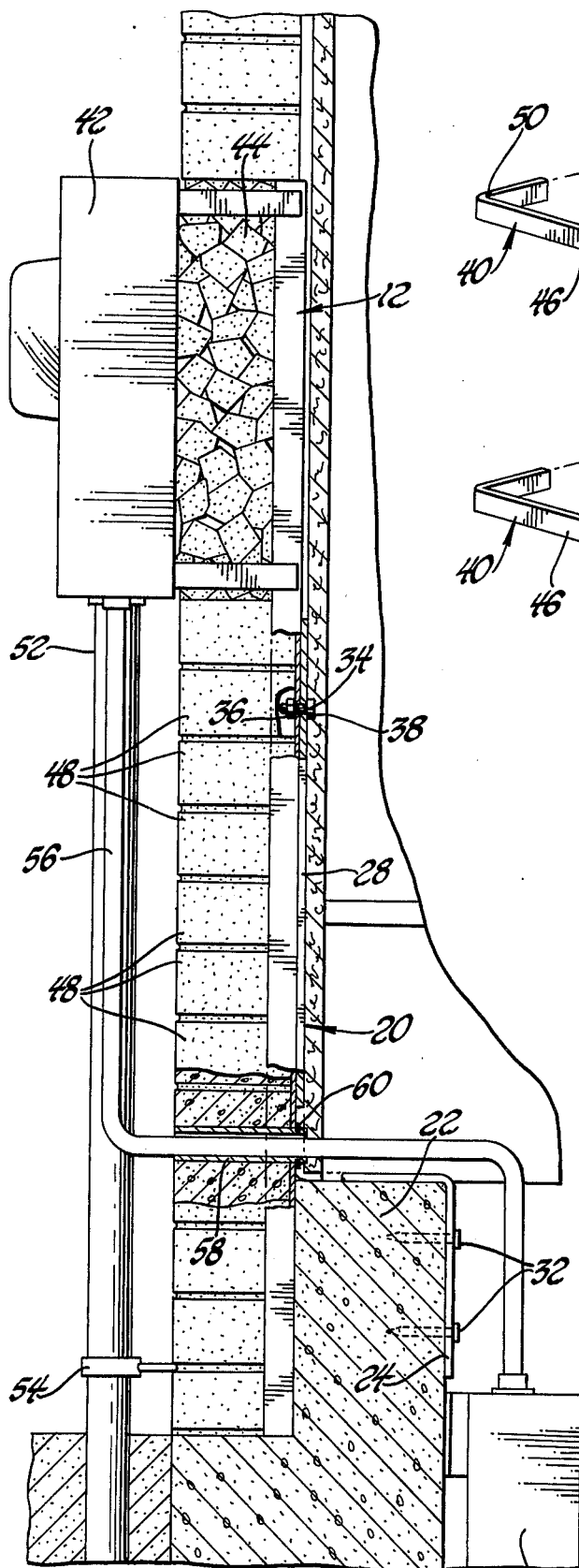
FIG. 1 is a cross-sectional view of a first embodiment of the instant invention taken along line 1—1 of FIG. 3.

The utility meter pedestal 10 includes a vertical support member generally indicated at 12 which includes a vertically extending, rectangular plate 14 with flanges 16 disposed on the longitudinal edges thereof and extending outwardly therefrom. The vertical supporting member 12 includes a hole 18 extending therethrough, the purpose of which will be discussed hereinafter.

A bracket 20 is attached to the vertical support member 12 and extends therefrom for rigidly securing the vertical support member 12 to the upper edge of the foundation 22 of a building. The bracket 20 includes a generally vertical leg portion 24 displaced from and disposed parallel to the vertical support member 12. The leg portion 24 depends from an integral connecting link 26, connecting the leg member 24 to an integral backer arm 28 fastened to the vertical support member 12. The backer arm 28 of bracket means 20 includes holes 34 which align with holes 36 on the plate 14 to receive nut and bolt fasteners 38 to secure bracket means 20 to vertical support member 12. The bracket 20 may alternatively be welded to support members.

The connecting link 26 is displaced from the lower end of the vertical support member 12, defining a downwardly facing, generally rectangular opening between plate 14 and leg member 24 to receive the upper edge of the foundation 22, as best shown in FIG. 1. The dimensions of the opening are such that the engaging surfaces of the bracket 20 and vertical support member 12 firmly engage the walls of the foundation.

Leg member 24, depending from connecting link 26 on the bracket 20, includes holes 30 for receiving suitable fasteners, such as concrete penetrating nails, 32 to secure the bracket 20, and therefore the vertical support member 12, in an upright position on the foundation of the building. Alternatively, a bracket member may be set into the concrete as the foundation is being poured, therefore, providing means for attaching the vertical support member 12 to the building foundation.

The utility meter pedestal 12 includes connecting means in the form of vertically spaced rigid metal brackets 40 defining a mounting surface 46, for mounting a watt-hour meter 42 thereon to support the watt-hour meter 42 in an elevated position above the foundation 22 of the building. The brackets 40 include forwardly extending arms such that the mounting surface 46 is spaced forwardly from the vertical support member 12 to provide a space 44 between the mounting surface 46 and the plate 14 of the vertical support member 12. The horizontal dimension of space 44 is such that the watt-hour meter 42, when mounted on brackets 40, is substantially flush with the outer surface of the facing material of the building as shown in FIG. 1.

Figure 3:
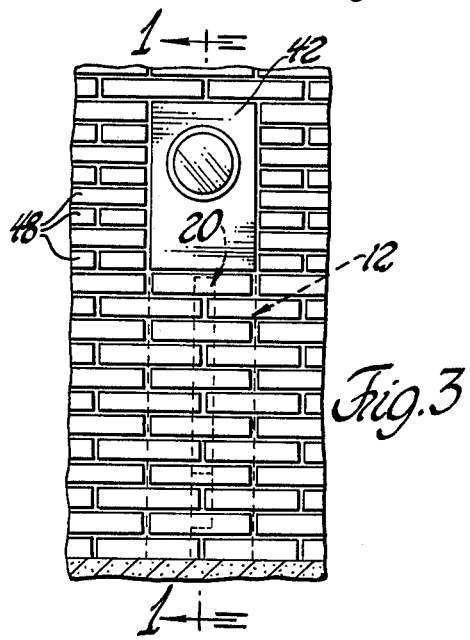
FIG. 3 is a front elevational view of the first embodiment of the instant invention mounted within a building wall.

The surface material illustrated in the drawings is made up of bricks 48 laid up to and surrounding the watt-hour meter 42 as shown in FIG. 3. The space 44 may be filled up with broken brick or a course of full bricks, whichever is more desirable. In the case of a building with a surface material narrower than a brick, such as aluminum siding or asbestos siding, connecting brackets with shorter legs 50 may be used to decrease the distance between the mounting surface 46 and the vertical support member 12. The aluminum siding, for example, can then be put up to cover the support member 12 while the watt-hour meter 42 remains substantially flush with the outer surface of the siding. Obviously brackets with longer arms 50 than those shown can be used when wider material, such as cinder blocks are used as a facing material.

The free ends of the legs 50 of the connecting brackets 40 are attached to the flanges 16 on the plate 14 by means of suitable fasteners. In the preferred embodiment of the instant invention spot welds are used to fasten the legs 50 to the flanges 16; however, bolt and nut or any other fastener devices may be employed.

Power is supplied to the watt-hour meter 42 through a supply conduit 52 extending from the underground service cable. A strap 54 set in a mortar joint between two courses of bricks helps support the supply conduit 52. Another conduit 56 extends downwardly from the watt-hour meter 42 and passes through the wall of the building where it is connected to an electrical distribution panel 62 mounted on the interior of the foundation wall. A passage conduit 58 mounted in hole 18 on plate 14 provides a passageway through the wall and plate 14. The passage conduit 58 is held in place by a snap ring 60 disposed in a circumferential groove 62 disposed on the passage conduit 58.

Figure 2:
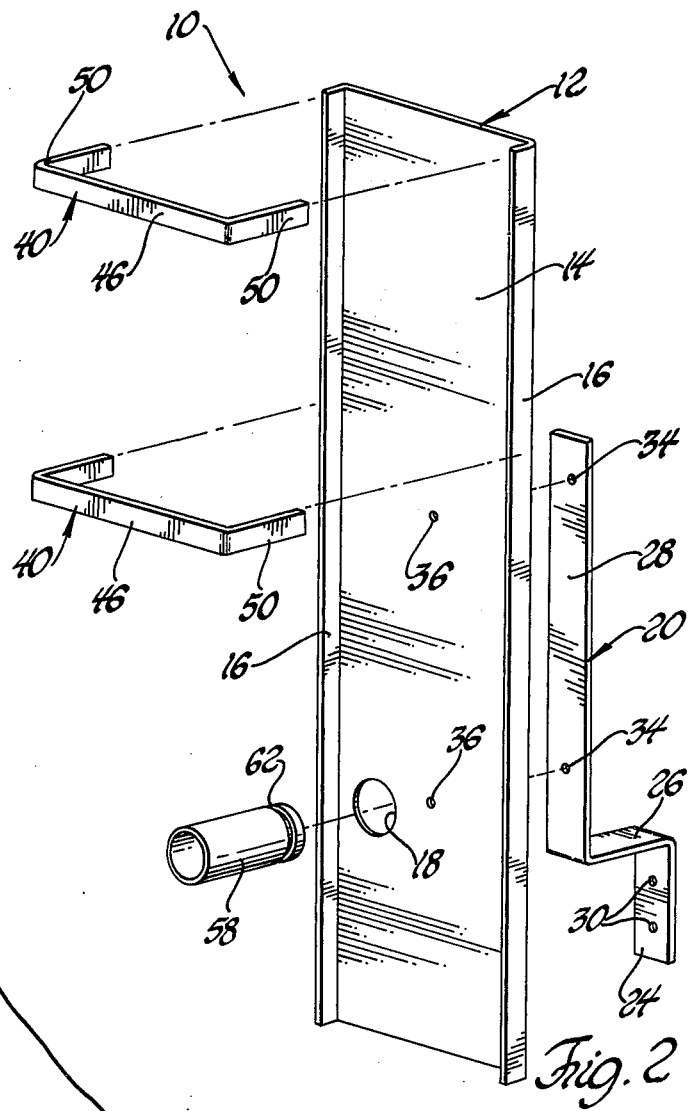
FIG. 2 is an exploded view of the first embodiment of the instant invention.

Although the pedestal 10 of the embodiment of FIGS. 1 through 3 is shown to receive and carry only one utility meter, it is to be understood that a multiple-width or multiple-height pedestal may also be employed where service requirements so indicate. Accordingly, meters may be mounted on such pedestals in stacked or side-by-side relationships. In addition, it is to be understood that a temporary outlet for construction service may be used in connection with the meter on pedestal 10, and later removed. This approach is typically used where the distribution panel is not yet in place when the pedestal and meter is installed, but a convenient power outlet is required. Finally, it is to be understood that a solid face plate may be used in place of the vertically spaced brackets 40, if this proves to be more convenient. This list of modifications and alternatives is not intended to be exhaustive, but only illustrative of the variations in implementation possible.

A second and preferred embodiment of the invention is shown in FIGS. 4 through 7 of the drawings. In this embodiment the utility meter pedestal 112 comprises a vertical support member 114 which is considerably narrower than the support member 14 of FIGS. 1 through 3 and which is provided with forwardly turned stiffening flanges 116. The support member 114 is rigidly secured, such as by welding, at the upper end thereof to a bracket 118 which in turn carries a watt-hour meter box 120. The box 120 is of a conventional type and is adapted to receive a plug-in type watt-hour meter 122 having the typical glass face which is familiar to those skilled in the art. The incoming power line extends through a vertically oriented conduit 123 which is rigidly secured to the bottom of the meter box 120 by means of a threaded end and a pair of clamp nuts (not shown). Conduit 123 may also be strapped to the support member 114 at one or more vertically spaced points to be held in parallel spaced relationship therewith by devices of the type shown at 54 in FIG. 1. Although the subject invention is illustrated in embodiments which accommodate underground utility services, it is to be understood that the incoming power cable could enter the box 120 through the top rather than through the bottom as shown, thus, to accommodate overhead electrical wiring arrangements.

Figure 4:
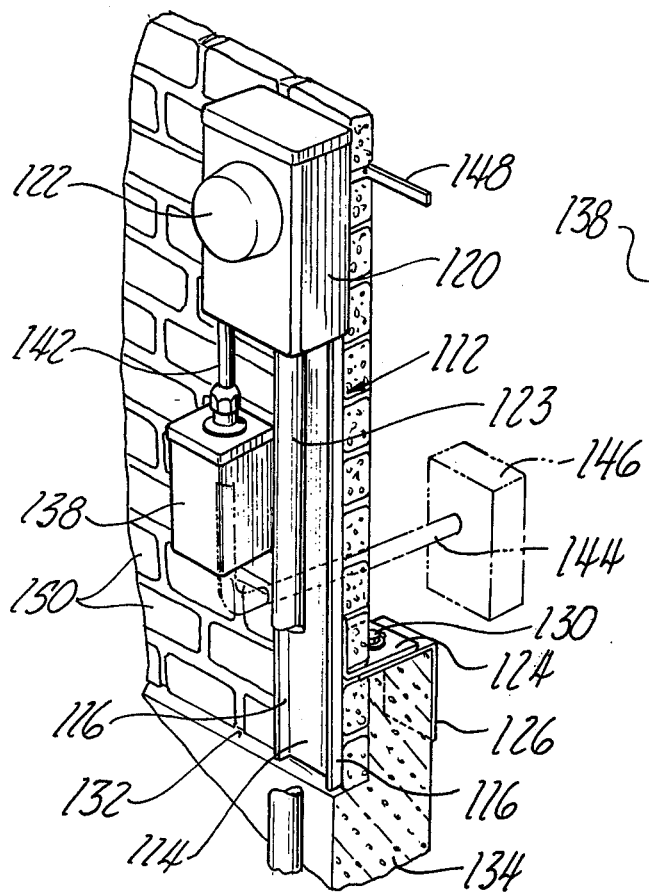
FIG. 4 is a perspective view of a second embodiment of the invention as installed in a brick-facade structure.

The pedestal 112 further comprises an L-shaped support bracket 124 having the short length secured, such as by threaded fasteners, to the rear of the vertical support member 114 and closer to the bottom end than to the top end, as illustrated in FIG. 4. Secured to the bracket 124 in adjustable relationship therewith is a second L-shaped bracket 126, the two brackets 124 and 126 being provided with alignable slots 128 to receive threaded fasteners 130. The combination of the brackets 124 and 126 is such as to embrace the upper edge of the poured concrete foundation 134 with the bottom of the support member 114 resting on the brick ledge or footer 132 as illustrated in FIG. 4. The slot 128 and fasteners 130 of the support brackets 124 and 126 not only adjust to accommodate foundations of varying thickness but adjust to accommodate the bricks 150 when the construction of the structure on foundation 134 reaches the advanced stages.

By this arrangement, the utility meter pedestal 112 may be installed on a concrete foundation before any above ground structure has been erected. Although the full integration of the pedestal 112 with the structure is not complete until the structure itself is built, the location of the pedestal 112 on the foundation 134 allows the installation of the electrical meter 122 and, as hereinafter described, allows the installation of a metered temporary power outlet so that electricity is consumed during the construction phase on a metered basis.

Figure 5:
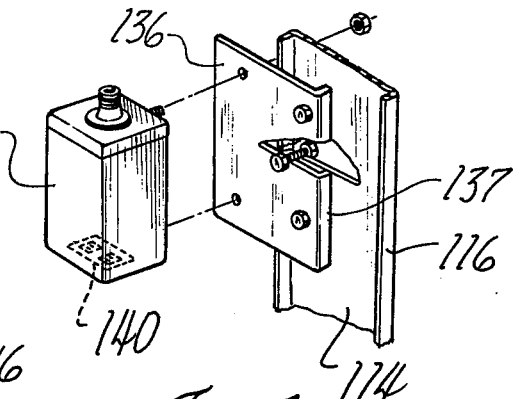
FIG. 5 is a perspective view with parts broken away of a detail of the second embodiment.
Figure 6:
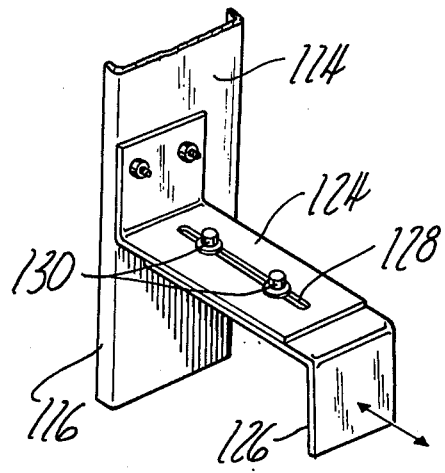
FIG. 6 is a rear perspective view of another detail of the second embodiment.

The temporary electrical power outlet is provided by means of a mounting bracket 136 having a flange 137 along one end thereof, as shown in FIG. 5, and adapted to be mounted by suitable threaded fasteners on the vertical support member 114 just below the meter box 120. Bracket 136 receives a junction box 138 carrying a standard duplex outlet 140 suitably wiring to the meter terminals in box 120 by way of a flexible conduit 142. Accordingly, any and all electrical power which is consumed by devices connected via duplex outlet 140 passes through the meter 122 and may be billed by the utility company to the proper party. Once the need for a temporary power outlet is past, the junction box 138 and the duplex outlet 140 is romoved, along with the mounting bracket 136 and the meter power outlet illustrated by conduit 142 is simply extended through the wall and into the distribution panel 146 on the inside of the structure. The extension 144 is illustrated in FIG. 4, it being understood that such extension is not present until the temporary power outlet represented by junction box 138 is removed.

Figure 7:
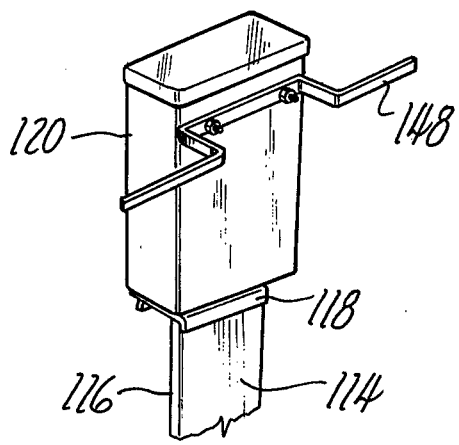
FIG. 7 is a rear perspective view of still another detail of the second embodiment.

To complete the installation after the above-ground structure has been erected and the brick facade 150 is in place a bracket 148 is secured to the back of the meter box 120, as shown in FIG. 7, the laterally outwardly extending prongs of the bracket 148 being imbedded in the mortar between adjacent brick tiers so as to suitably secure the upper end of the assembly of FIG. 4 into the brick facing material.

The invention has been described in an illustrative manner and it is to be understood that the terminology which has been used is intended to be in the nature of words of description rather than of limitation.

The embodiments of the invention in which an exclusive property or privilege is claimed are defined as follows:

1. A utility meter pedestal for mounting on a foundation of the type having parallel front and rear surfaces and a top surface before above-ground walls are erected on said top surface of said foundation and comprising: a rigid elongate support member having top and bottom ends and adapted to be placed against and parallel to the front surface of said foundation and to extend vertically upwardly to a point substantially above the top surface thereof, a substantially L-shaped bracket secured to the rear of said member adjacent the lower end and having a vertical portion spaced rearwardly therefrom to embrace said foundation between said vertical portion and said member and to support and secure the elongate support member on said foundation prior to the erection of said wall, mounting means on the member adjacent the upper end and a utility meter box mounted on the mounting means so as to be carried by said member and supported relative to said foundation both prior to and after the erection of the wall on the foundation, said L-shaped bracket including means for adjusting the horizontal spacing between support member and said vertical portion.

2. Apparatus as defined in claim 1 wherein said member comprises a rigid metal plate having at least one longitudinal flange adjacent the edge thereof for rigidification.

3. Apparatus as defined in claim 1 wherein said foundation comprises a horizontal brick ledge, a brick facade built thereon, the vertical spacing between the bottom of the support member and the support bracket being such that the bottom of the support member rests on the brick ledge while the bracket embraces the foundation to support the member and the meter box.

4. Apparatus as defined in claim 3 wherein the mounting means comprises a pair of vertically spaced U-shaped brackets having legs extending horizontally forwardly from said member by at least the thickness of said facade, said utility meter box being mounted on said brackets so as to be spaced forwardly of said support member.

5. Apparatus as defined in claim 1 further comprising an additional mounting means on said support member, a junction box and temporary outlet means disposed on said additional mounting means and electrical conductor means connecting the meter box to said outlet to provide metered temporary power externally of the structure of said foundation.

6. Apparatus as defined in claim 1 including a second bracket secured to the support member adjacent the upper end thereof and adapted to be fastened to said wall after the erection thereof.

7. In combination: a building structure and a utility meter pedestal comprising a foundation having a footer ledge vertically spaced from the upper extremity of said foundation to receive a brick facade, a rigid elongate support plate having top and bottom ends, the bottom end resting on said footer ledge with the plate extending vertically upwardly therefrom, a support bracket secured to the rear of said plate and embracing said foundation for support of said plate, mounting means carried by said plate adjacent the upper end thereof, a utility meter box on said mounting means, a brick facade supported by said footer ledge and extending vertically upwardly from said foundation and extending between said support plate and said foundation, and an additional support bracket secured to the assembly of said support plate and meter box adjacent the upper end thereof and extending horizontally rearwardly thereof through the brick facade to prevent the upper extremity of said assembly from being separated from said facade.

8. Apparatus as defined in claim 7 including an additional mounting bracket on said support plate, and outlet means carried by said additional mounting means and electrically connected to said meter box to provide temporary electrical power.

9. Apparatus as defined in claim 7 wherein said bracket includes means for adjusting the horizontal spacing between the bracket and the plate.

10. A utility meter pedestal for mounting on a foundation of the type having parallel front and rear surfaces and a top surface before above-ground walls are erected on the said top surface of the foundation and comprising: a rigid metal plate of at least several feet in length and having at least one stiffening flange formed along a lateral edge thereof and adapted to be placed against and parallel to the front surface of said foundation and to extend vertically upwardly to a point substantially above the top surface of the foundation, a substantially L-shaped bracket secured to the rear of the plate adjacent the lower end thereof and adapted to embrace the foundation between the front and rear surfaces thereof and to support the plate securely on the foundation prior to the erection of the above-ground wall, mounting means mounting a utility meter box on the plate adjacent the upper end thereof, a second bracket on the box for subsequently securing the upper end of the plate to the wall after erection thereof, and means for adjusting the L-shaped bracket to accommodate foundations of varying thickness between the front and rear surfaces.

* * * * *